May 9, 1967 T. F. HELMS 3,318,143
PULL-TAB CLOSURE TESTER
Filed June 12, 1964 4 Sheets-Sheet 1
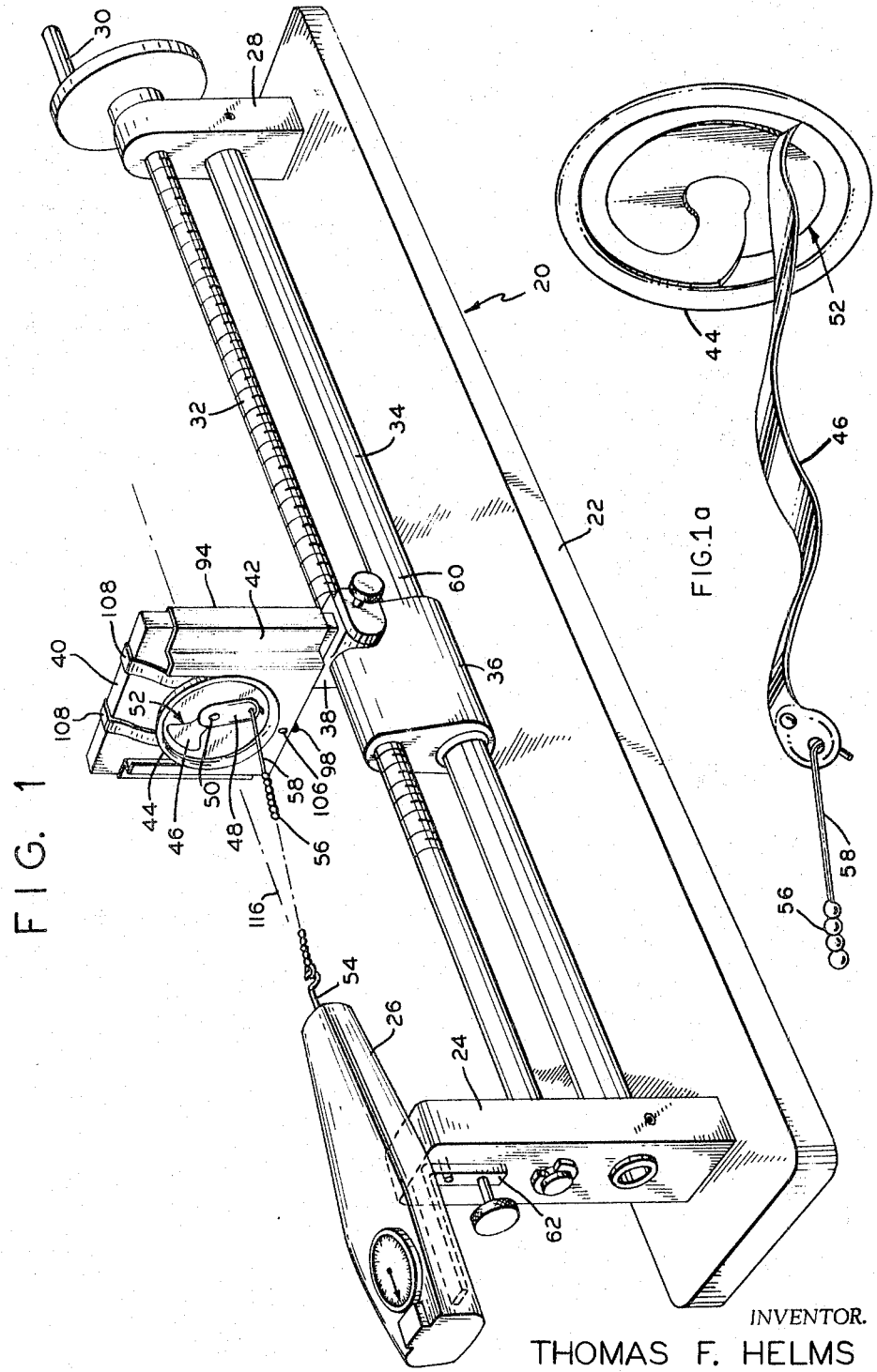
INVENTOR.
THOMAS F. HELMS
BY
ROBERT H. WARE
ATTORNEY.

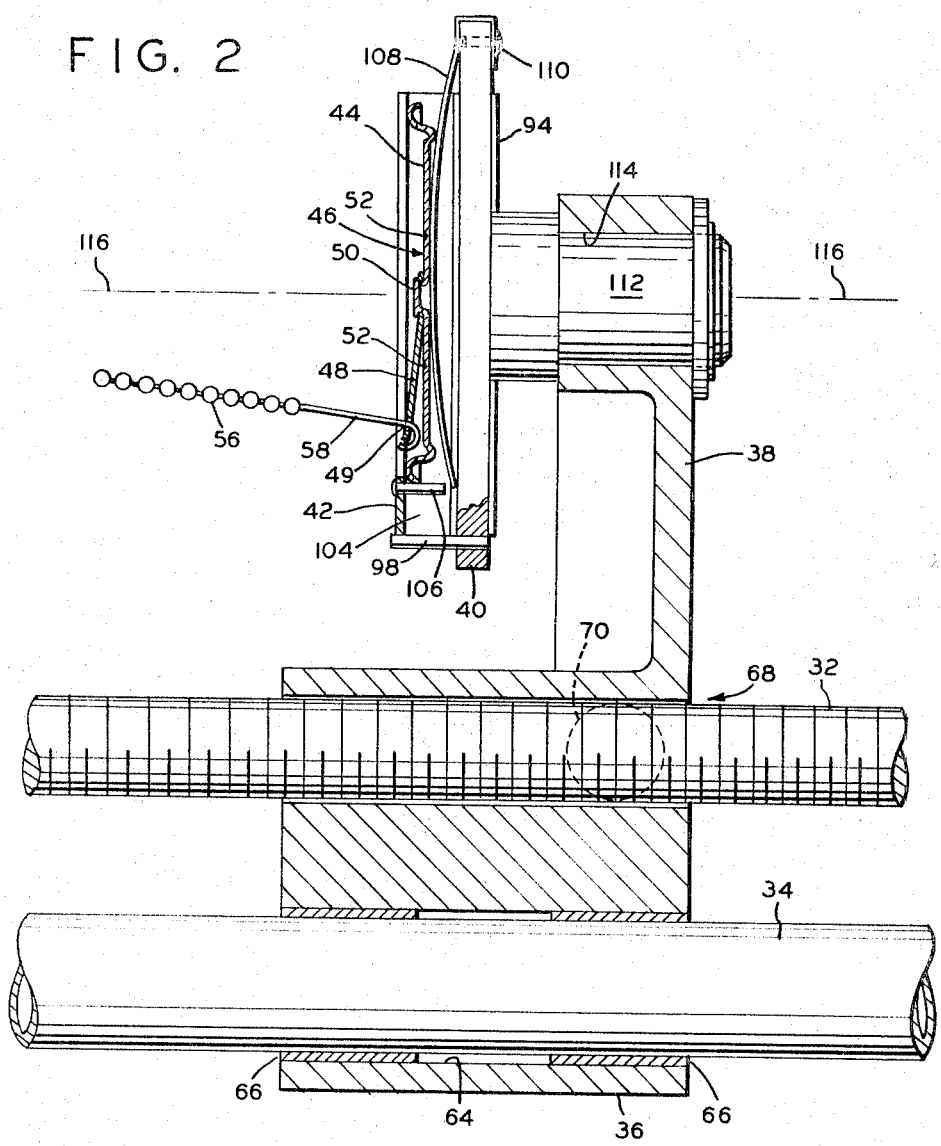
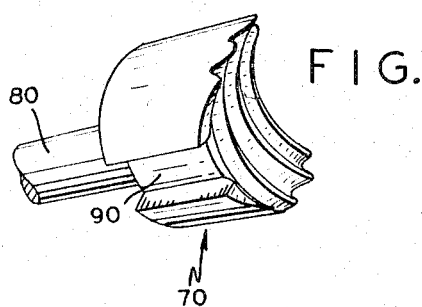

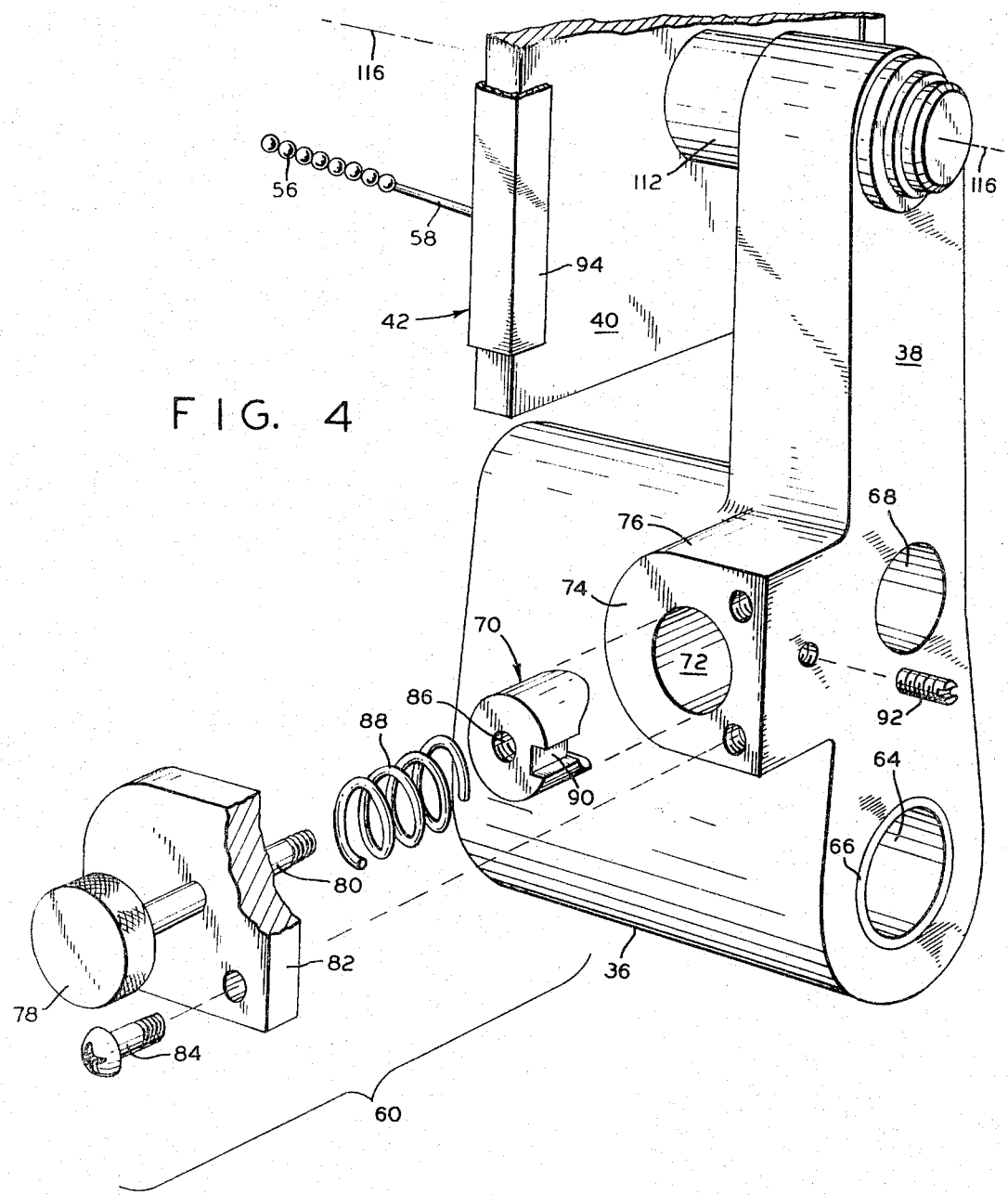

May 9, 1967 T. F. HELMS 3,318,143
PULL-TAB CLOSURE TESTER
Filed June 12, 1964 4 Sheets-Sheet 4
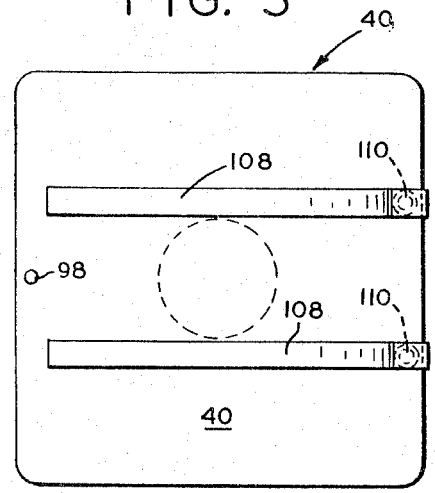
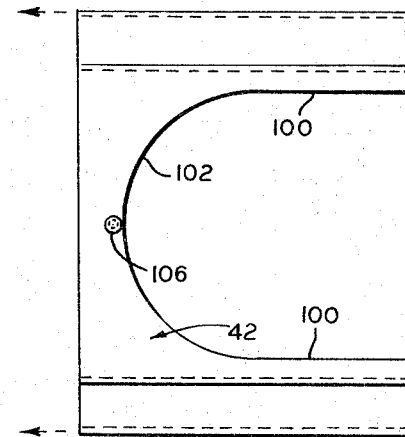
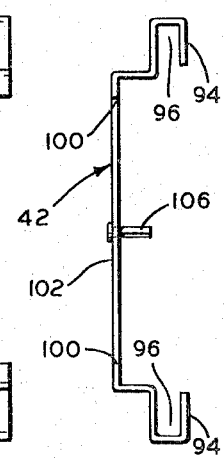
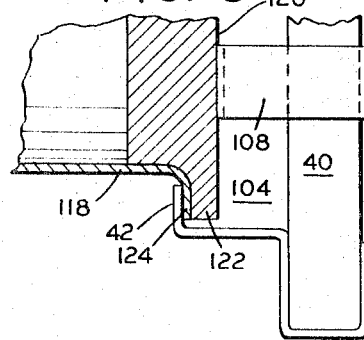
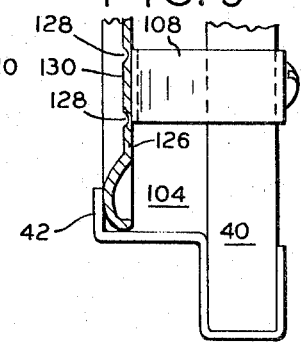
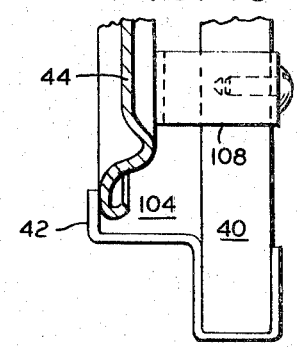
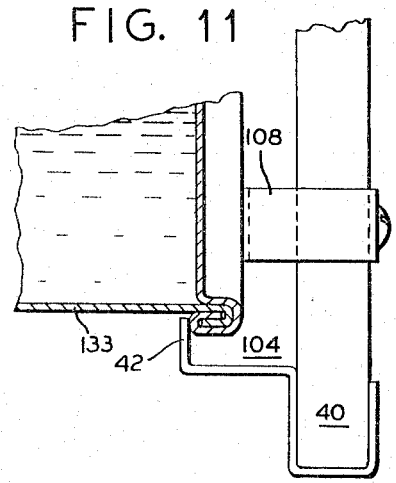
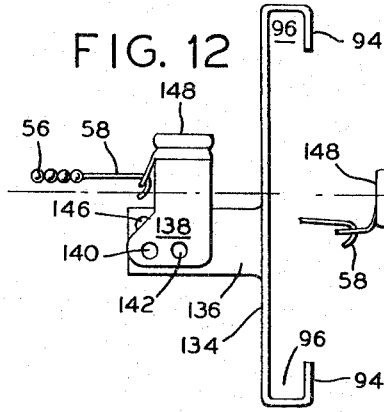
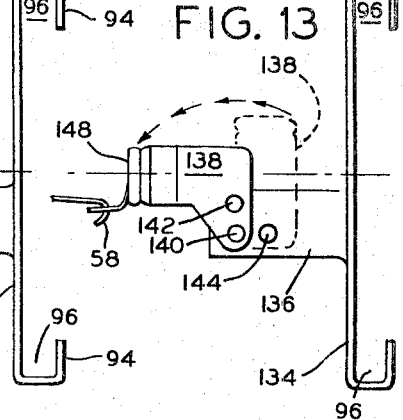
INVENTOR.
THOMAS F. HELMS
BY
ROBERT H WARE
ATTORNEY.

United States Patent Office

3,318,143
Patented May 9, 1967

---

3,318,143
PULL-TAB CLOSURE TESTER
Thomas F. Helms, New Fairfield, Conn., assignor to Country Engineering Inc., Danbury, Conn.
Filed June 12, 1964, Ser. No. 374,631
6 Claims. (Cl. 73—96)

This invention relates to force-measuring devices for determining the pull required to rupture and sever "pull-tab" container tear-out segments in such closures as can tops, bottle caps or the like. More particularly, it relates to an adjustable, easily-indexed, self aligning testing mechanism for use in quality control testing of such closures.

There has recently been increasing use of beverage cans having scored removable wall segments, ruptured and severed from the container by the leverage of a finger pull-tab. Similar pull-tab tear-strip closure breakers have also found increasing acceptance on other types of containers. This has increased the need for simple and reliable testing devices to determine the amount of force required to initiate tearing of the container wall, and also to measure the continuing pull required to tear away the removable container wall segment to open the container completely. Prior art devices have proved unduly bulky, complex, expensive and unreliable.

When the tear-out segments are formed during container manufacture, scoring dies are used to weaken the container wall material along the edges of the tear-out segment. These dies initially have sharp edges, forming well-defined grooves in the container wall or top, and producing the desired tear-out action when the container is opened. During manufacturing, the sharp edges of the dies are worn away by continued use, and the resulting score impressions become ragged and shallow, increasing the amount of force required to break the tear-out segment away from the container wall by initial rupture along the score line, and also increasing the pull required to tear out the segment by continued tearing along the score lines.

Furthermore, improper adjustment of the scoring dies may produce complete or nearly complete severing of the tear-out segment from the container wall, or may produce such deep score lines that the container will fail to retain its contents, particularly with pressurized charges such as carbonated beverages and the like, damaging warehouse stocks and making the resulting containers useless and economically wasteful.

When tear-out containers are opened by the user, shallow imperfect score lines produced by worn scoring dies will require excessive force to open the container by leverage on the lift tab, causing serious inconvenience to the user, and sometimes requiring the use of pliers or supplemental opening equipment to release the contents of the container for use.

Accordingly, a principal object of the present invention is to provide a testing device for determining the force required to break and tear away scored tear-out segments of container walls.

Another object of the invention is to provide such testing devices which are easily adapted for testing of can tops, bottle caps and other container elements having tear-out segments.

A further object is to provide such testing devices with self-aligning testing jigs, assuring that the measured force is reproduceably applied along the desired line of action of pulling force on each container or component tested.

Another object is to provide testing devices capable of measuring the tear resistance of long tear-out strips, or long spiral tear-out sections which require substantial elongation of the testing span during the tear-out operation. The devices of this invention permit speedy resetting of the mechanism for subsequent testing, with maximum convenience for the testing operator.

Other and more specific objects will be apparent from the features, elements, combinations and operating procedures disclosed in the following detailed description and shown in the drawings, in which:

FIGURE 1 is a front perspective view of a testing device incorporating one embodiment of the invention, with a beverage can top in position ready for pull testing;

FIGURE 1a is a fragmentary view of a testing jig employed in a modified embodiment of the invention to accommodate spiral shaped tear-strip container segments;

FIGURE 2 is an enlarged front sectional elevation view showing a preferred form of the adjustable testing jig assembly;

FIGURE 3 is a perspective view of the retractable half nut employed for convenient indexing of the testing jig assembly;

FIGURE 4 is an exploded perspective view of the testing jig and half nut withdrawal mechanism showing their co-operating construction;

FIGURE 5 is a face elevation view of the jig plate shown in FIGURES 1 and 2;

FIGURE 6 is a similar face view of a preferred form of telescoping jig employed in testing of beverage containers and tops having pull-tab tear-out segments;

FIGURE 7 is an end elevation view of the jig shown in FIGURE 6;

FIGURE 8 is a fragmentary, enlarged end elevation view of the assembled jig and jig plate, loaded with an open can and ready for testing a tab section on its remote end;

FIGURE 9 is a similar fragmentary enlarged end elevation view showing the same assembled jig and jig plate holding a spirally-scored can top ready for testing of the force required to sever and tear away its spiral tear-out strip;

FIGURE 10 is a similar fragmentary enlarged end elevation view of the assembled jig and jig plate holding a beverage container top in position for testing;

FIGURE 11 is a similar fragmentary end elevation view of the assembled jig and jig plate holding a loaded container ready for testing the severable tab section on its remote end;

FIGURE 12 is an end elevation view on a reduced scale of a different form of testing jig plate adapted to hold a transversely-severable "Chug-a-mug" container cap in two different positions for initial severing and final transverse tear-off of its scored tear-out segment; and FIGURE 13 shows the jig of FIGURE 12 in its second, "tear off" position.

A testing device 20 shown in the perspective view of FIGURE 1 incorporates, supporting its other elements and subassemblies, a base 22 having at one end a scale pedestal 24 supporting a pull type spring scale 26, with an indexing pedestal at the opposite end of base 22. A threaded feed screw 32 of substantial length is rotatably supported spanning the base 22 between pedestals 24 and 28, and is turned by an indexing crank 30 at the indexing pedestal 28. A stationary guide rail 34 spans the base 22 parallel to feed screw 32 between pedestals 24 and 28, and a movable traversing carriage 36 is slidably mounted on guide rail 34 and engageable for indexing drive by rotation of feed screw 32. Carriage 36 supports an upstanding jig column 38 on which jig plate 40 is rotatably journalled to support jig 42, shown holding a lift-tab beverage container top 44 in position for testing the pull required to break and tear out its scored removable segment 46.

Testing operation

A typical beverage can top 44 having a scored tear-out segment 46 is shown in FIGURES 1 and 2, where the top 44 is provided with a lever pull tab 48 firmly secured to one end of the tear-out segment 46 by a self-formed rivet 50. The tear-out segment 46 is peripherally defined by an impressed score line 52 stamped into one face of the top 44 by scoring dies during its manufacture. As indicated in FIGURES 1 and 2, the pull-tab top 44 selected for testing is inserted in the jig 42 positioned on the jig plate 40, and the actuator 54 of the scale is joined by such means as the ball chain 56 and its attached hook 58 to a small testing aperture 49 formed near the end of pull tab 48.

When the operator turns the crank handle 30, the resulting rotation of feed screw 32 moves the carriage 36 axially to take up the slack in chain 56 and apply the leverage load on the pull tab directly to spring scale 26. Further rotation of feed screw 32 moves jig 42 away from the scale, applying increasing levering force upon the pull tab 48. The scale may be observed by the operator to determine the breaking load at which the pull tab leverage first ruptures the score line to initiate tear-out. Following this initial tear-out, further indexing of carriage 36 applies continuing force to the pull tab causing further tearing away of tear-out segment 46 to complete the opening of the tear-out container top, and the tear-out force required to perform and complete this operation is indicated on scale 26 throughout the tearing operation.

A convenient engaging mechanism 60 is mounted on carriage 36 for releasable engagement with feed screw 32, and the mechanism 60 is shown in exploded detail in FIGURE 4. Operation of the engaging mechanism 60 enables the operator to reindex the carriage 36 following the testing operation, and place it quickly in position for the succeeding test operation, re-engaging carriage 36 with feed screw 32 promptly for repeated similar testing operations in quick succession.

Supporting structure

The base 22 and pedestals 24 and 28 may be cast together of aluminum to form the supporting structure for the testing devices of this invention. Feed screw 32 has its ends respectively journalled for rotation in the pedestals 24 and 28, and it is held in position therein by C rings fitting in terminal grooves in the feed screw, as indicated in FIGURE 1. The guide rail 34 may be a length of aluminum tubing having both of its ends fixed in pedestals 24 and 28, directly beneath feed screw 32. A removable bracket 62 holds the scale 26 in position on top of scale pedestal 24.

Jig carriage

The jig carriage 36 is shown in detail in FIGURES 2 and 4, and is provided with a lower guide bore 64 having oilite sleeve bearings 66 fixed at each end, slidingly accommodating the guide rail 34. Parallel to guide bore 64 is a second bore passing through carriage 36 and forming a smooth feed screw passage 68 within which the feed screw 32 revolves without touching the walls thereof. Engagement of the carriage 36 with the feed screw 32 is achieved by the retractable half nut 70 shown in FIGURE 3, engaged and disengaged by means of the engaging mechanism 60 shown in the exploded view of FIGURE 4.

Engaging mechanism

As shown in FIGURE 4, the carriage 36 is provided with a transverse bore 72 extending from the front face 74 of a boss 76 toward the feed screw passage 68, in which the bore 72 terminates. Bore 72 slidingly accommodates the half nut 70, which is thereby aligned and positioned for threaded engagement with feed screw 32. A retraction handle 78 is provided with a stem 80 passing through a hole in a cover plate 82 and having its threaded end engaged in a threaded hole 86 in the front face of the half nut 70. Cover plate 82 is secured on front face 74 of boss 76 by screws 84, and a coil spring 88 compressed inside bore 72 between cover plate 82 and half nut 70 urges the half nut into engagement with feed screw 32, from which it is retracted by manual withdrawal of retraction handle 78.

Half nut 70 is provided with an alignment groove 90 which slidingly engages the tip of a threaded alignment screw 92, which protrudes into the interior of bore 72 through a smaller threaded hole passing through the side of boss 76.

Testing jig assemblies

As shown in FIGURE 7, the testing jig 42, formed of thin stainless steel, is provided with lateral reverse flanges 94 defining mounting grooves 96 adapted for sliding telesoping engagement with the opposite edges of jig plate 40, and the jig 42 is mounted by sliding it downwardly edgewise, in engagement with jig plate 40, until its lower edge rests upon an alignment pin 98 protruding from the lower front face of the jig plate 40, shown in FIGURES 2 and 5. The front face of testing jig 42 is cut away to form an enlarged U-shaped notch defined by parallel edges 100 and a semicircular bottom edge 102. As shown in FIGURES 7–11, the front face of jig 42 is offset and spaced away from the jig plate 40 to form a mounting cavity 104 (FIGURES 2 and 8), and a positioning pin 106 extends from the front face of jig 42 into the cavity 104 toward jig plate 40 (FIGURES 2 and 7).

As indicated in FIGURES 2 and 8, for example, the container or component to be tested is positioned in cavity 104 behind jig 42, and it is urged toward jig 42 by two arched resilient leaf rings 108, each having one end anchored by screws 110 near the edge of jig plate 40 and having their free ends extending downward into cavity 104, arching toward the front face of jig plate 40. As shown in FIGURE 2, the jig plate 40 is provided with a shouldered mounting stud 112 extending from its back face away from jig 42 through a pivot aperture 114 extending through the top of jig column 38 on carriage 36 substantially parallel to feed screw 32. The round stud 112 is held rotatably in pivot aperture 114 by a C-ring engaged in a terminal groove in stud 112 on the opposite side of jig column 38 from jig plate 40. Jig plate 40 is thus freely adapted for rotation about the testing axis 116 of pivot aperture 114, providing automatic self-alignment of the force indicator and the tested component. By this means, as traversal of the carriage tautens the chain 56, the jig automatically swivels to bring the hook 58 to a position close to the testing axis 116 connecting the scale 26 and the component 44 being tested, while continuously holding the component in proper initial testing position, with the tear-out segment 46 lying in a plane substantially perpendicular to the testing axis 116.

The testing jig 42 is flexibly adaptable for testing various container components. For example, an open can 118 having a pull tab tear-out segment in its opposite, remote end is shown in FIGURE 8 with its open outwardly flanged end held in jig 42, ready for testing the remote tear-out segment (not shown). Separate can tops 126 and 44 are shown in position for testing in FIGURES 9 and 10, and a loaded and sealed can is shown held in position for testing in FIGURE 11.

In FIGURE 8, the open can 118 is provided with an end plug 120 having a peripheral flange 122 mating with the out-turned rim flange 124 of the can 118. The can 118 assembled with the end plug 120 is positioned in jig 42, with springs 108 bearing against plug 120 to hold the can flange 124 inside the U-shaped testing aperture defined by the semicircular edge 102 of jig 42, thus firmly anchoring the open can 118 in testing position.

In FIGURE 9 a separate can top 126 having a pair of spiral grooves 128 forming a spiral tear strip 130 is positioned in mounting cavity 104, with springs 108 urging its partially rolled rim against jig 42, thus holding the can top 126 in testing position.

In FIGURE 10 the pull tab beverage can top 44 shown in FIGURES 1 and 2 is similarly held in position in mounting cavity 104 by the pressure of springs 108 urging its partially rolled rim against jig 42.

Finally, in FIGURE 11 springs 108 urge the rolled and sealed rim of a filled beverage can 133 toward the inner face of jig 42, to anchor the filled can 133 firmly in testing position.

*Two-position mandrel jig*

A mandrel jig 134, adapted for testing tear strips extending across both the top and the side flange of a container closure cap, is shown in FIGURES 12 and 13. The jig 134 carries an off-center pivot post 136 on which is pivotally mounted a pivoted mandrel 138 having a free end shaped in the form of the container rim, on which a closure cap 148 is mounted for testing. The mandrel 138 is joined by a pivot 140 to the post 136, and can swing from the transverse position shown in FIGURE 12 about pivot 140 to the longitudinal position shown in FIGURE 13. An anchor pin 142 extends through an anchoring aperture in the pivoted mandrel 138 into engagement with a transverse anchor hole 144 in post 136 (FIGURE 13) to latch and secure the mandrel in the transverse position shown in FIGURE 12, and pin 142 extends into a longitudinal anchor hole 146 in post 136 (FIGURE 12) to latch and secure the mandrel in the longitudinal position in FIGURE 13. As shown in FIGURE 12, the hook 58 engages an apertured tab at the edge of the closure cap 148 in the transverse position, and after the initial tear-out force has been determined in this position, the mandrel 138 is pivoted to the longitudinal position of FIGURE 13, where the pull required to tear the scored tearoff strip across the top of the cap 148 is measured by further indexing of the carriage 36.

A container cap having a pull tab on its top joined to a tear-out strip extending across the top and down its side may similarly be tested by positioning mandrel 138 in the longitudinal position in FIGURE 13 for initiating tear-out, and then shifting mandrel 138 to the transverse position of FIGURE 12 to complete the tear-off of the tear-out strip down the side of the container cap.

The adaptability of the testing devices of the present invention for measuring the tear-out force required to open containers and container components of many different kinds is apparent, as indicated in FIGURE 1 and FIGURES 8–13. The substantial length of feed screw 32 allows the jig 42 to be withdrawn away from the spring scale 26 over a substantial distance, permitting full-length tear-out of an elongated sprial tear-strip 130 in can top 126, for example, as indicated in FIGURE 1a. When the test is completed, manual retraction of the handle 78 disengages half nut 70 from feed screw 32, allowing quick re-indexing of carriage 36 in preparation for a succeeding test.

Scale 26 and jig 42 may be reversed and mounted on carriage 36 and pedestal 24 respectively if desired.

Similarly, the highly adaptable jig 42 accommodates open cans and various types of can tops as well as filled and sealed cans, as shown in FIGURES 8–11, and the pivoted mandrel jig 134 shown in FIGURES 12 and 13 likewise adapts the device for convenient testing of container caps with tear-strips extending both across their tops and down their sides. Accordingly, the co-operating features of this invention provide a uniquely simple and economical testing device for measuring the forces required to initiate and to complete the removal of tear-out components of many different types of cans, containers and packages.

While the objects of the invention are efficiently achieved by the preferred forms of the invention described in the foregoing specification, the invention also includes changes and variations falling within and between the definitions of the following claims.

I claim:

1. A force-indicating testing device for determining the forces required to tear away a removable tear-out segment of a container, comprising in combination:
   (A) elongated support means,
   (B) an elongated feed screw rotatably mounted on the support means,
   (C) elongated guide means mounted on the support means and extending parallel to the rotatable feed screw,
   (D) a traversing carriage movable along the guide means and disengageably and drivingly engaged with the feed screw,
   (E) a force-indicator mounted on the support means,
   (F) a testing jig assembly secured to the traversing carriage and aligned to hold and present a container component to be tested with its removable tear-out segment facing the force-indicator, incorporating a mandrel pivotable between two different latched positions, whereby a container component incorporating a tear-out segment having portions extending in two different planes can be successively presented in two different orientations for testing,
   (G) and force-transmitting means connecting the tear-out segment to the force-indicator,
whereby rotation of the feed screw drives the carriage away from the force-indicator, applying tear-out force to tear away the tear-out segment, the amount of which force is continuously indicated by the force-indicator.

2. A force-indicating testing device for determining the forces required to tear away a removable tear-out segment of a container, comprising in combination:
   (A) elongated support means,
   (B) an elongated feed screw rotatably mounted on the support means,
   (C) elongated guide means mounted on the support means and extending parallel to the rotatable feed screw.
   (D) a traversing carriage movable along the guide means and disengageably and drivingly engaged with the feed screw,
   (E) a force-indicator mounted on the support means,
   (F) a testing jig assembly secured to the traversing carriage and aligned to hold and present a container component to be tested with its removable tear-out segment facing the force-indicator, incorporating means forming an open-sided aperture having an edge spaced to overlap the rim of a container component to expose a tear-out segment for testing,
   (G) and force-transmitting means connecting the tear-out segment to the force-indicator,
whereby rotation of the feed screw drives the carriage away from the force-indicator, applying tear-out force to tear away the tear-out segment, the amount of which force is continuously indicated by the force-indicator.

3. A force-indicating testing device for determining the forces required to tear away a removable tear-out segment of a container, comprising in combination:
   (A) elongated support means,
   (B) an elongated feed screw rotatably mounted on the support means,
   (C) elongated guide means mounted on the support means and extending parallel to the rotatable feed screw,
   (D) a traversing carriage movable along the guide means and disengageably and drivingly engaged with the feed screw,
   (E) a force-indicator mounted on the support means,
   (F) a testing jig assembly secured to the traversing carriage and aligned to hold and present a container component to be tested with its removable tear-out segment facing the force-indicator, incorporating a jig removably engageable upon a jig plate mounted on the traversing carriage, with a portion of the jig being spaced from the jig plate to provide a container component-receiving cavity therebetween, (G) and force-transmitting means connecting the tear-out segment to the force-indicator, whereby rotation of the feed screw drives the carriage away from the force-indicator, applying tear-out force to tear away the tear-out segment, the amount of which force is continuously indicated by the force-indicator.

4. A force-indicating testing device for determining the forces required to tear away a removable tear-out segment of a container, comprising in combination:

(A) elongated support means, (B) an elongated feed screw rotatably mounted on the support means, (C) elongated guide means mounted on the support means and extending parallel to the rotatable feed screw, (D) a traversing carriage movable along the guide means and disengageably and drivingly engaged with the feed screw, (E) a force-indicator mounted on the support means, (F) a testing jig assembly (1) aligned to hold and present a container component to be tested with its removable tear-out segment facing the force-indicator, and (2) rotatably secured to the traversing carriage and freely pivotable about a testing axis passing through the jig assembly and the force-indicator, (G) and force-transmitting means connecting the tear-out segment to the force-indicator, whereby rotation of the feed screw drives the carriage away from the force-indicator, applying tear-out force to tear away the tear-out segment, the amount of which force is continuously indicated by the force-indicator.

5. The combination defined in claim 3 wherein the jig plate incorporates resilient means urging a container component positioned in the cavity toward the removable jig.

6. A force-indicating testing device for determining the forces required to tear away a removable tear-out segment of a container component comprising in combination:

(A) elongated support means, (B) an elongated feed screw rotatably positioned on the support means, (C) elongated guide means mounted on the support means and extending parallel to the rotatable feed screw, (D) a traversing carriage movable along the guide means and disengageably and drivingly engaged with the feed screw, (E) a force-indicator mounted on the support means, (F) a testing jig assembly including a jig plate rotatably secured to the traversing carriage freely pivotable about a testing axis passing through the jig assembly and the force-indicator, and aligned to hold and present a container component under test with its removable tear-out segment facing the force-indicator, including (1) a jig removably engageable upon the jig plate with a portion of the jig being spaced from the jig plate to provide a container component-receiving cavity therebetween;

(2) means forming an open-sided aperture in the jig having an edge spaced to overlap the rim of a container component positioned in the cavity to expose a tear-out segment of the component for testing;

(3) resilient means secured to the jig plate and positioned to urge the container component under test toward the jig, (G) and force transmitting means connecting the tear-out segment to the force indicator, whereby rotation of the feed screw drives the carriage away from the force-indicator, with the force transmitted causing rotation of the jig plate about the testing axis to a stable testing position, and applying tear-out force to tear away the tear-out segment, the amount of which force is indicated by the force-indicator.

References Cited by the Examiner

UNITED STATES PATENTS

| | | | |
|---|---|---|---|
| 143,626 | 10/1873 | Huntington | 74—424.8 |
| 166,366 | 8/1875 | Hebdon | 73—95 |
| 298,704 | 5/1884 | Norris et al. | 74—424.8 |
| 464,766 | 12/1891 | Wendler | 73—95 |
| 788,716 | 5/1905 | Hammond et al. | 74—424.8 |
| 2,473,517 | 6/1949 | Freedman | 73—150 |

OTHER REFERENCES

Hunter Pull Testers. Catalog 750–P. Copyright by American Machine and Metals, Inc. in 1961. Received by Patent Office Aug. 4, 1961.

RICHARD C. QUEISSER, *Primary Examiner.*

J. C. GOLDSTEIN, *Assistant Examiner.*